J. FLEMING.
POULTRY EXERCISING FEEDER.
APPLICATION FILED SEPT. 6, 1918.
1,297,821.
Patented Mar. 18, 1919.
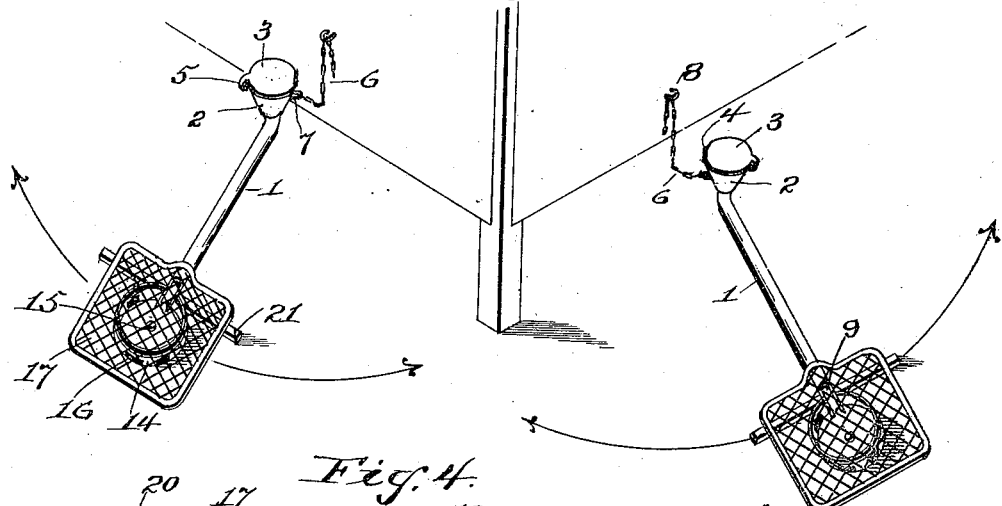
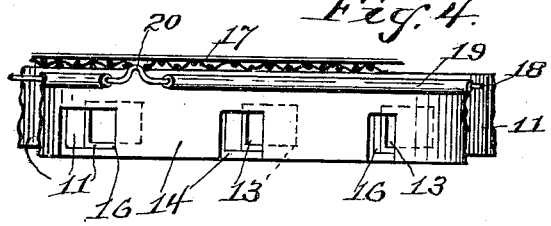
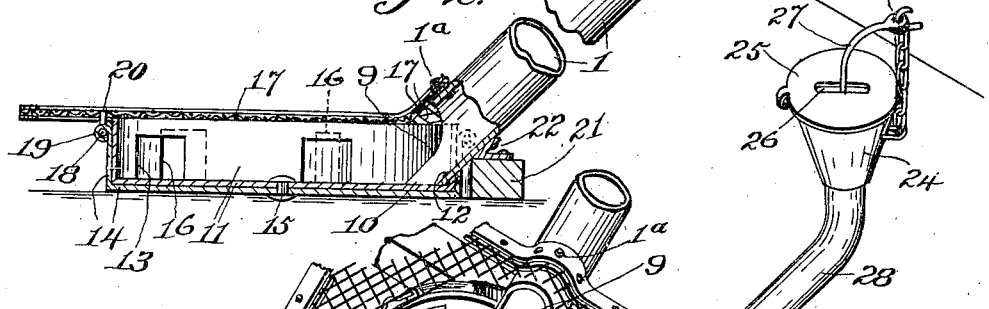
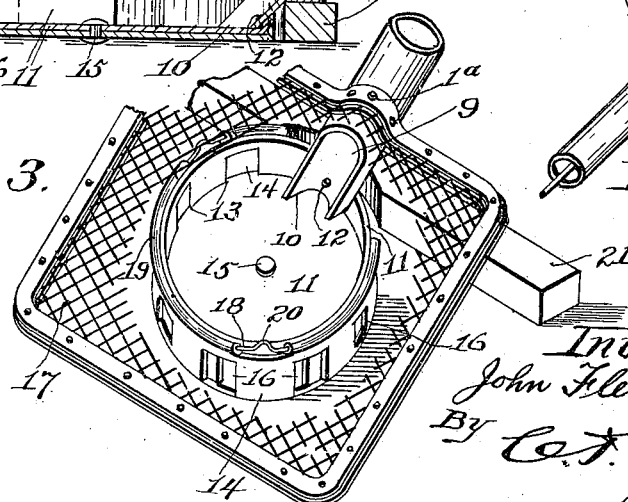
Inventor,
John Fleming
By C. F. Belt
Attorney.

UNITED STATES PATENT OFFICE.

JOHN FLEMING, OF HOUGHTON, MICHIGAN.

POULTRY-EXERCISING FEEDER.

1,297,821.  Specification of Letters Patent.   Patented Mar. 18, 1919.

Application filed September 6, 1918.   Serial No. 252,936.

*To all whom it may concern:*

Be it known that I, JOHN FLEMING, a citizen of the United States, residing at Houghton, in the county of Houghton and State of Michigan, have invented certain new and useful Improvements in Poultry-Exercising Feeders, of which the following is a specification.

This invention relates to poultry feeding and pertains especially to a feeder adapted to be operated by the poultry for feeding.

The object of the invention is to provide a poultry feeder adapted to be operated by the scratching action of poultry for obtaining food, so that only the food as is scratched from the feeder is accessible for feeding.

A further object of the invention is to provide a poultry feeder adapted to be anchored for free swinging movement with a portion or member thereof resting on the ground and adapted to be agitated and moved to various positions by the natural scratching action of the poultry.

A still further object of the invention is to provide a poultry feeder adapted to be anchored for swinging movement in contact with the ground, and operated by the natural scratching of the poultry to deposit the food on the ground in amounts according to the scratching activity of the poultry, whereby the poultry is necessarily exercised preparatory to feeding.

It is well known that in raising poultry exercise is inducive to good health and production; therefore, I have provided a device for containing and exposing food without the latter being accessible or obtainable until scratched out by the poultry, such scratching causing deposits of the food and displacement of the device to various positions on the ground for further scratching.

In the accompanying drawings forming part of this application:

Figure 1 is a perspective view showing the application of the invention.

Fig. 2 is a central sectional view partly broken away.

Fig. 3 is a perspective view of the food receiving and deposit tray showing the feeding tube and balance bar applied thereto.

Fig. 4 is a detail side view of part of the device.

Fig. 5 is a perspective view of a modification.

The same reference characters denote the same parts through the views of the drawings.

In carrying out my invention I employ a tube 1 forming a food conveyer or chute having a funnel 2 attached to the upper end thereof. The funnel has a cover or lid 3 hinged at 4 and is provided with a fastening 5. A chain 6 is attached to the funnel or to the tube of the feeder, as at 7, for attaching to a hennery or coop, as at 8, or to any other suitable object as may be desired in locating one or more of the feeders. The tube or chute 1 inclines downwardly from the funnel and its lower end is cut out at 9 and has a beveled edge 10 fitting the bottom of a pan or tray 11, to which this end of the tube is soldered or otherwise secured, as by rivets 12, so that the pan or tray will rest flat upon the ground for receiving food from the tube. The tray is provided with side openings or slots 13, and the exit of food through said slots is controlled by a ring-slide or shutter 14 having a base pivoted to the tray at 15 and having graduated slots 16. A screen or wire netting 17 is attached to the top of the tray so as to cover and extend beyond the side of the tray, and the screen is attached to the tube, as at 1ª, by soldering or otherwise, so as to cover the tube cut-out 9 and thereby expose the food to view as it falls from the tube into the tray. The movement of shutter ring 14 is controlled by a wire 18 held by the rim 19 of the ring 14, and having one or more spring loop projections 20 which engage the mesh of the screen for holding the ring in such position as it may be placed for opening and closing, or partially so, the exit slots for regulating the discharge of food through the slots 13 and 16. The screen, the tube and the tray are attached or connected so that the ring may be given circular movement on the tray, and for this reason the ring may be cut away to provide for the tube and to permit the ring to be slid circularly sufficiently to control the exit of food through slots. In order to balance and prevent tilting or overturning of the tray, especially during poultry scratching of the screen and consequent movement of the feeder, a balance bar 21 is attached to the tube, as at 22.

It will be seen that the feeder is capable of being shaken and moved or displaced by poultry scratching, as indicated by the arrows in Fig. 1 of the drawings, and that such scratching and shaking discharges the food through the tray slots, but, by reason of the screen overlapping the tray and covering such food discharges, the fowls must continue scratching or working in order to move the feeder and render the food accessible for feeding. The slots 13 of the same size and the slots 16 of different sizes permit passage of various food in various amounts.

Referring to the modification shown in Fig. 5, the funnel 24 has a lid 25 provided with a slot 26 through which an agitator wire or rod 27 extends into the feeding pipe 28. The rod 27 is anchored, as at 29, and is free to move with every movement of the pipe in a feeding operation.

Obviously, after the ring is set for feeding as desired, the fowls must first work the food out of the tray and then move or drag the feeder to one side or the other in order to get at the food deposited on the ground by the first scratching. These operations may be repeated for feeding and exercising a great number of fowls with one or more feeders, as desired, or as occasion may demand.

I do not wish to confine the invention to any particular size and material, nor do I wish to limit myself to any particular means for anchoring the feeder so that it may be worked on the ground by fowls preparatory to feeding therefrom, but reserve the right to make such changes and variations in the manufacture and practical application of the invention as may be considered within the scope of the appended claims.

Having thus described my invention, what I claim as new and desire to secure by Letters Patent is:

1. A poultry feeder comprising a food tube, a feeding tray attached to and receiving from the tube, a screen covering the tray, and means for anchoring the tube so as to permit movement of the feeder in a feeding operation.

2. A poultry feeder comprising a food tube, a feeding tray attached to the discharge end of the tube which has a cut-out portion, a screen covering the tray and said portion, means for controlling exit of food from the tray, and means for anchoring the tube so as to permit movement of the feeder in a feeding operation.

3. A poultry feeder comprising a food tube, a feeding tray attached to the discharge end of the tube and having inclined position relative to the tray, a screen covering the tray and said discharge end, a balance bar, and means for anchoring the tube so as to permit movement of the feeder in a poultry scratching and feeding operation.

4. In a poultry feeder, a feeding tray having food exits, a food conveyer connected with the tray and means for anchoring the tube so as to permit sliding movement of the tray in a feeding operation, and a screen covering the tray and overhanging said exits.

5. In a poultry feeder, a feeding tray having food exits, a screen cover for the tray, a ring shutter slidable on the tray for controlling the exits, and means projecting from the ring and engaging the screen for controlling the movement of the ring.

6. In a poultry feeder, a feeding tray having food exits, a screen attached to and covering the tray, a shutter slidable around the tray and under the screen for controlling the exits, and means for controlling the movement of the shutter.

In witness whereof I hereunto set my hand in the presence of two witnesses.

JOHN FLEMING.

Witnesses:
J. ROSS COLHOUN,
C. T. BELT.

Copies of this patent may be obtained for five cents each, by addressing the "Commissioner of Patents, Washington, D. C."